(12) United States Patent
Kimura et al.

(10) Patent No.: US 10,763,482 B2
(45) Date of Patent: Sep. 1, 2020

(54) CONNECTION MEMBER

(71) Applicants: TOYOTA JIDOSHA KABUSHIKI KAISHA, Toyota-shi, Aichi-ken (JP); YAZAKI CORPORATION, Minato-ku, Tokyo (JP)

(72) Inventors: Kenji Kimura, Miyoshi (JP); Katsunori Sato, Toyota (JP); Tomohiro Ikeda, Toyohashi (JP); Yoshiaki Ichikawa, Yokkaichi (JP); Hirotaka Mukasa, Iwata (JP); Taishi Sakai, Fukuroi (JP)

(73) Assignees: TOYOTA JIDOSHA KABUSHIKI KAISHA, Toyota-shi, Aichi-ken (JP); YAZAKI CORPORATION, Minato-ku, Tokyo (JP)

( * ) Notice: Subject to any disclaimer, the term of this patent is extended or adjusted under 35 U.S.C. 154(b) by 326 days.

(21) Appl. No.: 14/766,330

(22) PCT Filed: Jan. 23, 2014

(86) PCT No.: PCT/JP2014/000346
§ 371 (c)(1),
(2) Date: Aug. 6, 2015

(87) PCT Pub. No.: WO2014/122893
PCT Pub. Date: Aug. 14, 2014

(65) Prior Publication Data
US 2015/0380713 A1    Dec. 31, 2015

(30) Foreign Application Priority Data
Feb. 8, 2013 (JP) ................................ 2013-022787

(51) Int. Cl.
*H01M 2/20* (2006.01)
*H01M 2/34* (2006.01)
(Continued)

(52) U.S. Cl.
CPC .............. *H01M 2/206* (2013.01); *H01G 2/04* (2013.01); *H01G 11/10* (2013.01); *H01G 11/76* (2013.01);
(Continued)

(58) Field of Classification Search
CPC .......... H01M 2/206; H01M 2/26; H01M 2/34; H01M 2200/108; H01G 2/04;
(Continued)

(56) References Cited

U.S. PATENT DOCUMENTS

| | | | | |
|---|---|---|---|---|
| 4,806,440 A | * | 2/1989 | Hahs, Jr. ............... | H01M 2/105 429/1 |
| 2004/0070128 A1 | * | 4/2004 | Balsells ................. | F16F 1/045 267/180 |

(Continued)

FOREIGN PATENT DOCUMENTS

| | | |
|---|---|---|
| CN | 101652880 A | 2/2010 |
| CN | 102881855 A | 1/2013 |

(Continued)

*Primary Examiner* — Stewart A Fraser
(74) *Attorney, Agent, or Firm* — Sughrue Mion, PLLC

(57) ABSTRACT

A connection member configured to electrically connect respective storage elements to each other in a power storage device constituted by a plurality of storage elements. The connection member includes: a substrate; and a plurality of connecting portions connected to electrodes of the respective storage elements and configured to cut off electric connection with the storage elements by fusing at the time when a current of a predetermined value or more flows therein. The connecting portion is formed by performing punching on the substrate and includes at least two bent portions bent in a punching direction. One of the bent portions is bent along a first direction perpendicular to the punching direction, and the other one of the bent portions is
(Continued)

bent along a second direction perpendicular to the punching direction and perpendicular to the first direction.

11 Claims, 12 Drawing Sheets

(51) Int. Cl.

| | |
|---|---|
| *H01H 85/08* | (2006.01) |
| *H01G 2/04* | (2006.01) |
| *H01H 37/76* | (2006.01) |
| *H01G 11/10* | (2013.01) |
| *H01G 11/82* | (2013.01) |
| *H01H 37/32* | (2006.01) |
| *H01G 11/76* | (2013.01) |
| *H01M 2/26* | (2006.01) |
| *H01H 85/20* | (2006.01) |

(52) U.S. Cl.
CPC ............. *H01G 11/82* (2013.01); *H01H 37/32* (2013.01); *H01H 37/761* (2013.01); *H01H 85/08* (2013.01); *H01M 2/26* (2013.01); *H01M 2/34* (2013.01); *H01H 2085/2055* (2013.01); *H01M 2200/108* (2013.01); *Y02E 60/13* (2013.01)

(58) Field of Classification Search
CPC ........ H01G 11/10; H01G 11/82; H01H 37/32; H01H 37/761; H01H 85/08; H01H 2085/2055; Y02E 60/13
See application file for complete search history.

(56) References Cited

U.S. PATENT DOCUMENTS

| | | | |
|---|---|---|---|
| 2010/0015519 A1 | 1/2010 | Trester et al. | |
| 2011/0104958 A1* | 5/2011 | Kwon ................... | H01M 2/105 439/816 |
| 2012/0225333 A1* | 9/2012 | Kim ...................... | H01M 2/021 429/61 |
| 2012/0301762 A1* | 11/2012 | Welker ................ | H01M 2/1061 429/99 |
| 2013/0017436 A1 | 1/2013 | Kume | |
| 2013/0029204 A1 | 1/2013 | Khakhalev et al. | |
| 2013/0202941 A1 | 8/2013 | Ono et al. | |

FOREIGN PATENT DOCUMENTS

| | | | | |
|---|---|---|---|---|
| JP | WO 2012164884 A1 * | 12/2012 | ............ | H01H 69/02 |
| WO | 2008/121224 A1 | 10/2008 | | |
| WO | 2012/164884 A1 | 12/2012 | | |

* cited by examiner

CONNECTION MEMBER

TECHNICAL FIELD

The present invention relates to a power storage device in which a plurality of storage elements is electrically connected to each other. More particularly, the present invention relates to a bus bar (a connection member) connected to a positive electrode or a negative electrode of each of the storage elements.

BACKGROUND ART

In Patent Document 1, a positive bus bar for connecting positive electrodes of a plurality of cylindrical batteries and a negative bus bar for connecting negative electrodes thereof are provided. The positive and negative electrodes of the cylindrical batteries are connected to respective bus bars via a fuse (a current limiter). A lead wire is used as the fuse, and when a current of a predetermined value or more such as an excess current flows, fusing is caused due to heat generation, so that electric connection between the bus bar and the positive electrode of the cylindrical battery and/or electric connection between the bus bar and the negative electrode of the cylindrical battery are/is cut off.

CITATION LIST

Patent Documents

Patent Document 1: International Publication No. 2008/121224

SUMMARY OF THE INVENTION

Problem to be Solved by the Invention

In Patent Document 1, different fuses are used for the battery and for the bus bar, so that it is necessary to connect the bus bar with the fuse and the cylindrical battery with the fuse, individually. Since the fuse and the bus bar are provided separately, there is such a problem that it is hard to secure a contact point that allows assembly tolerance, vibration displacement, and the like between the bus bar and the cylindrical battery.

On this account, it is necessary to take measures for the fuse in consideration of assembly tolerance and a stress caused by displacement due to vibration or the like. However, when the fuse is thinned, the displacement due to vibration or the like can be easily absorbed, but a current amount to flow is decreased, which causes an increase in an amount of heat generation and restrains an allowable current amount to flow. In the meantime, when the fuse is made large to increase a current amount to flow, an increase in heat generation and a restraint of the allowable current amount can be relaxed, but the displacement due to vibration or the like is hard to be absorbed.

In view of this, an object of the present invention is to provide a connection member configured to electrically connect respective storage elements to each other in a power storage device constituted by a plurality of storage elements, which connection member has a fusing characteristic as a fuse and is able to efficiently absorb/disperse stresses relative to displacements in three-dimensional directions between the storage elements and the connection member due to vibration or the like.

Means for Solving the Problem

A connection member according to a first invention of the present application is a connection member configured to electrically connect respective storage elements to each other in a power storage device constituted by a plurality of storage elements. The connection member includes: a substrate; and a plurality of connecting portions connected to electrodes of the respective storage elements and configured to cut off electric connection with the storage elements by fusing at the time when a current of a predetermined value or more flows therein. The connecting portion is formed by performing punching on the substrate and includes at least two bent portions bent in a punching direction. Further, one of the bent portions is bent along a first direction perpendicular to the punching direction, and the other one of the bent portions is bent along a second direction perpendicular to the punching direction and perpendicular to the first direction.

In the first aspect of the present invention, the connecting portion formed integrally with the substrate includes at least two bent portions bent in the punching direction. Further, the at least two bent portions are bent along the first direction and the second direction perpendicular to the punching direction and perpendicular to each other. On this account, stresses to act in respective directions perpendicular to the punching direction are absorbed/dispersed by bending displacements of respective bent portions bent in a thickness direction, and a stress to act in the punching direction is absorbed/dispersed by a displacement of the whole connection member in the thickness direction.

Accordingly, the connection member has a fusing characteristic as a current limiter (a fuse), and can efficiently absorb/disperse stresses relative to those displacements in three-dimensional directions between the storage element and the connection member which are caused due to vibration or the like.

The connecting portion can be configured to include a first extension portion extending in the first direction, and a second extension portion extending from the first extension portion in the second direction. The at least two bent portions can be formed by bending the first extension portion and the second extension portion in the punching direction along their respective extending directions. Further, the connecting portion can be configured to further include a third extension portion extending from the second extension portion in the first direction in a direction reverse to the extending direction of the first extension portion.

The connecting portion can include a first extension portion extending generally in parallel with a direction perpendicular to the punching direction, a second extension portion bent from the first extension portion and extending generally in parallel with the direction perpendicular to the punching direction, and a third extension portion bent from the second extension portion and extending generally in parallel with the direction perpendicular to the punching direction. At this time, one of the bent portions can be formed such that a part bending between the first extension portion and the second extension portion is bent from a surface perpendicular to the punching direction along the first direction so as to become generally parallel with the punching direction. Further, the other one of the bent portions can be formed such that a part bending between the second extension portion and the third extension portion is bent from the surface perpendicular to the punching direction along the second direction so as to become generally parallel with the punching direction. Further, the third extension portion can be formed so as to extend from the second extension portion in a direction reverse to the extending direction of the first extension portion.

Respective bending directions of the at least two bent portions can be configured to be the same or different from each other in the punching direction.

The storage element can be configured as a cylindrical storage element having a longitudinal direction. The plurality of storage elements is arranged in line so that positive electrodes or negative electrodes placed in longitudinal-direction end parts thereof are oriented in the same direction. The connection member can be configured to be connected to respective negative electrodes of the plurality of storage elements.

With the connection member, it is possible to configure a power storage device including a plurality of storage elements electrically connected in parallel with each other by the connection member.

MODES FOR CARRYING OUT THE INVENTION

The following describes embodiments of the present invention.

Embodiment 1

Figure 1:
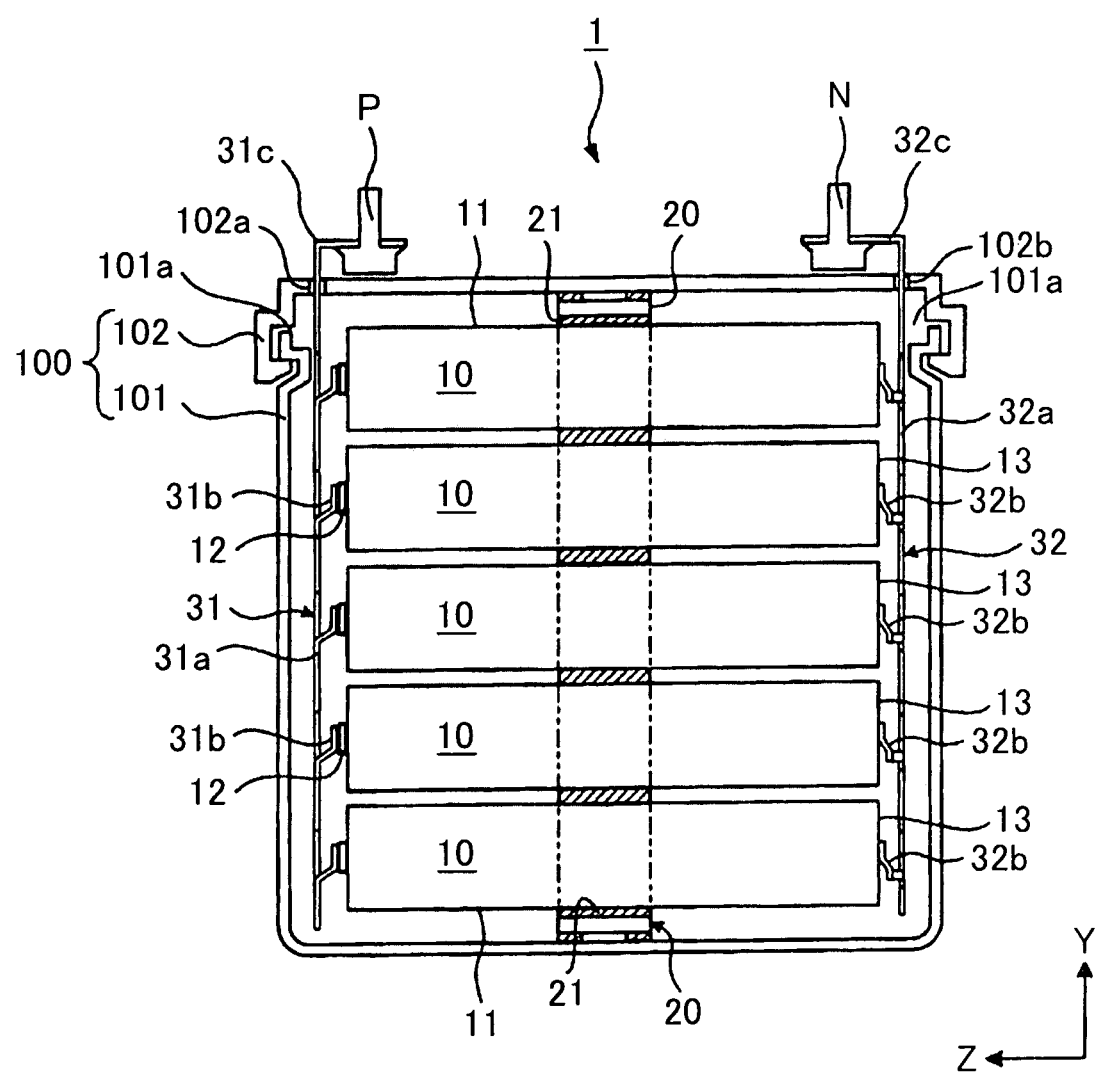
FIG. 1 is a view illustrating an internal configuration of a battery block in Embodiment 1.

FIGS. 1 to 11 are views each illustrating Embodiment 1 of the present invention. FIG. 1 is a view illustrating an internal structure of a battery block (corresponding to a power storage device) according to the present embodiment.

The battery block 1 includes a plurality of single cells (corresponding to storage elements) 10 and a case 100 for accommodating the plurality of single cells 10 therein. The case 100 includes a case main body 101 and a cover 102. The cover 102 is fixed to an upper end of the case main body 101, and closes an opening 101a formed in the case main body 101. The case main body 101 and the cover 102 can be made of resin, for example.

Figure 2:
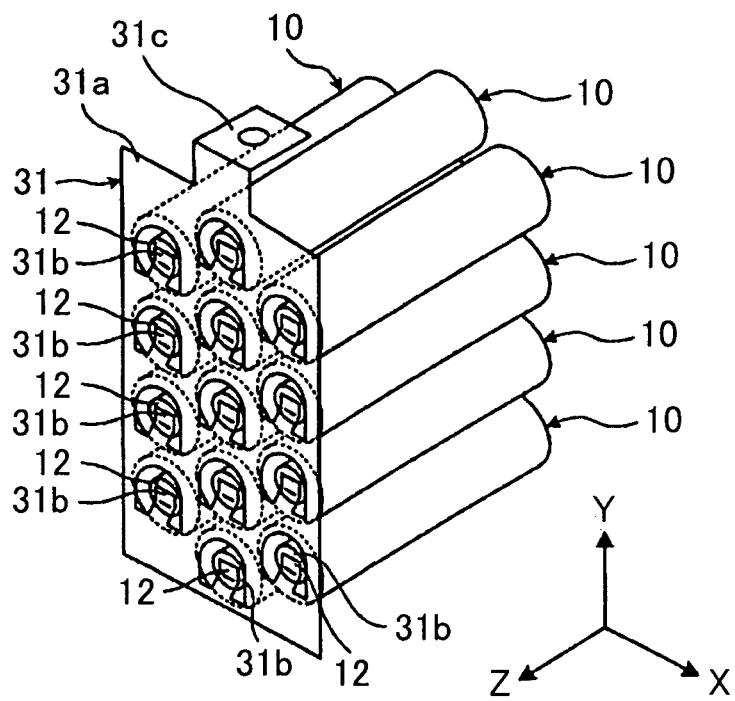
FIG. 2 is a view illustrating an arrangement state of a plurality of single cells in Embodiment 1.

The plurality of single cells 10 accommodated in the case 100 is placed as illustrated in FIG. 2. In FIGS. 1 and 2, an X-axis, a Y-axis, and a Z-axis are axes perpendicular to each other. Note that the plurality of single cells 10 can be placed in an arrangement different from the arrangement illustrated in FIG. 2. Further, the number of single cells 10 can be set as appropriate in consideration of a requested output and the like of the battery block 1.

Figure 3:
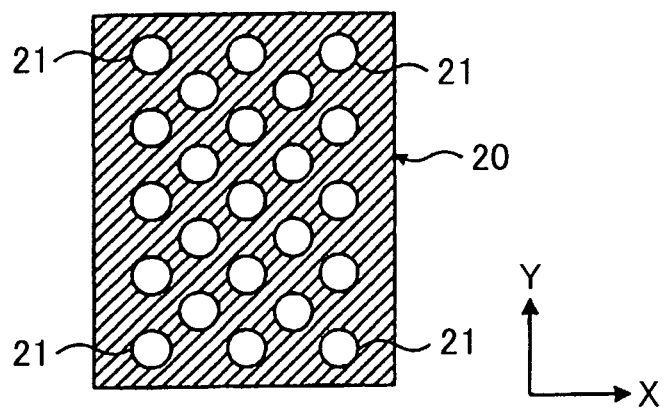
FIG. 3 is a front view illustrating a holder for holding the single cells of the battery block in Embodiment 1.

The plurality of single cells 10 is held by a holder 20. As illustrated in FIG. 1, the holder 20 holds a central part of each of the single cells 10 in an X-direction. The holder 20 has as many openings 21 as the number of single cells 10 as illustrated in FIG. 3. The plurality of single cells 10 is placed in line in an X-Y plane. In the example of FIG. 2, a row of five single cells 10 arranged in a Y-direction, and rows of four single cells 10 arranged in the Y-direction are placed in line along the X-direction.

Note that, in the present embodiment, the holder 20 holds the central parts of the single cells 10, but can hold other parts (e.g., end parts of the single cells 10). Further, the plurality of single cells 10 can be held by use of a plurality of holders 20.

The single cell 10 is inserted into the opening 21, and an adhesive is filled into a gap formed between the opening 21 and the single cell 10. As the adhesive, it is possible to use epoxy resin, for example. By filling the adhesive into the gap formed between the opening 21 and the single cell 10, it is possible to fix the single cell 10 to the holder 20. Further, instead of the epoxy resin, an elastically deformable resin frame may be provided in the gap formed between the opening 21 and the single cell 10, so that the single cell 10 is inserted into the holder 20 via the resin frame so as to be held therein.

The holder 20 can be made of metal such as aluminum, for example. When the holder 20 is made of metal, a heat dissipation property of the single cells 10 can be improved. The single cell 10 may generate heat by charging and discharging, and the like. If the holder 20 is made of metal, the heat generated from the single cells 10 can easily dissipates to the holder 20, thereby making it possible to restrain an increase in temperature of the single cells 10. Note that, even in a case where the holder 20 is made of a resin material or the like having high heat conductivity instead of the metal material, it is also possible to improve the heat dissipation property of the single cells 10.

The holder 20 is firmly fixed to the case 100. As a structure to fix the holder 20 to the case 100, it is possible to use a well-known structure as appropriate. For example, the holder 20 can be fixed to the case 100 by use of a bolt.

The single cell 10 is a so-called cylindrical battery. That is, the single cell 10 extends in a Z-direction, and a sectional shape of the single cell 10 on the X-Y plane is formed in a round shape. As the single cell 10, it is possible to use a 18650-type battery, for example. The 18650-type battery is a cylindrical battery having a diameter of 18 [mm] and a length of 65.0 [mm], and is formed in an elongated shape. Further, as the single cell 10, a secondary battery such as a nickel metal hydride battery or a lithium-ion battery can be used, and instead of the secondary battery, an electric double layer capacitor (a capacitor) can be used.

The single cell 10 includes a battery outer case 11 and a power generation element accommodated in the battery outer case 11. The power generation element is an element that performs charging and discharging, and includes a positive plate, a negative plate, and a separator placed between the positive plate and the negative plate. The separator contains an electrolyte.

The positive plate of the power generation element is electrically connected to a positive terminal 12 provided in one longitudinal-direction end of the single cell 10 in the Z-direction. The positive terminal 12 is constituted by a projection surface. The negative plate of the power generation element is electrically connected to a negative terminal 13 provided in the other longitudinal-direction end of the single cell 10 in the Z-direction. The negative terminal 13 is constituted by a flat surface. The positive terminal 12 and the negative terminal 13 constitute the battery outer case 11.

Respective positive terminals 12 of the plurality of single cells 10 are placed on the same side relative to the holder 20, and are connected to a bus bar 31 as illustrated in FIGS. 1 and 2. The bus bar 31 is made of a material having conductivity, such as metal. The bus bar 31 includes connecting portions 31b making contact with the respective positive terminals 12 of the single cells 10, and the number of connecting portions 31b provided herein is the same as the number of single cells 10 (positive terminals 12).

The connecting portions 31b can be formed by performing press working (punching, bending, or the like) of a single plate-shaped member 31a. The connecting portion 31b is formed in a shape projecting from the plate-shaped member 31a toward the positive terminal 12 of the single cell 10. The connecting portions 31b are welded to the positive terminals 12.

The bus bar 31 (the plate-shaped member 31a) is placed so as to be separated from the plurality of single cells 10 (the positive terminals 12) by a predetermined distance in the Z-direction. The connecting portion 3 lb projecting from the plate-shaped member 31a in the Z-direction is connected to the positive terminal 12 of the single cell 10. The whole bus bar 31 serving as a positive bus bar is positively charged by the plurality of single cells 10.

The bus bar 31 includes a lead portion 31c, and the lead portion 31c passes an opening 102a formed in the cover 102 of the battery block 1 so as to project outside the case 100. A positive terminal P of the battery block 1 is fixed to the lead portion 31c.

Respective negative terminals 13 of the plurality of single cells 10 are placed on that bottom side of the battery outer case 11 which is opposed to the positive terminals 12 in the longitudinal direction across the holder 20, and are connected to a bus bar 32 (corresponding to the connection member of the present invention). The bus bar 32 is made of a material having conductivity, such as metal. The bus bar 32 serving as a negative bus bar includes connecting portions 32b making contact with the negative terminals 13 of the single cells 10. The number of connecting portions 32b provided herein is the same as the number of single cells 10 (negative terminals 13), and the connecting portions 32b are welded to the negative terminal 13.

Further, the bus bar includes a lead portion 32c, and the lead portion 32c passes an opening 102b formed in the cover 102 so as to project outside the case 100. A negative terminal N of the battery block 1 is fixed to the lead portion 32c.

The plurality of single cells 10 of the present embodiment is placed in line so that the positive terminals 12 (or the negative terminals 13) of the single cells 10 are oriented in the same direction, so that one bus bar 31 (a first connection member) is connected to respective positive terminals 12 and one bus bar 32 (a second connection member) is connected to respective negative terminals 13 of the single cells 10. Hereby, the plurality of single cells 10 is electrically connected in parallel with each other.

Note that the present embodiment deals with one example in which all the single cells 10 are connected in parallel with each other so as to constitute the battery block 1 (an assembled battery), but the present embodiment is not limited to this. For example, the battery block 1 may be configured such that battery sets of a plurality of single cells 10 connected in parallel are connected in series with each other.

Further, the battery block 1 can be provided in a vehicle, so as to be used as a power source for causing the vehicle to run. More specifically, a plurality of battery blocks 1 is electrically connected in series with each other so as to constitute a battery pack, so that the battery pack can be provided in the vehicle.

Figure 4:
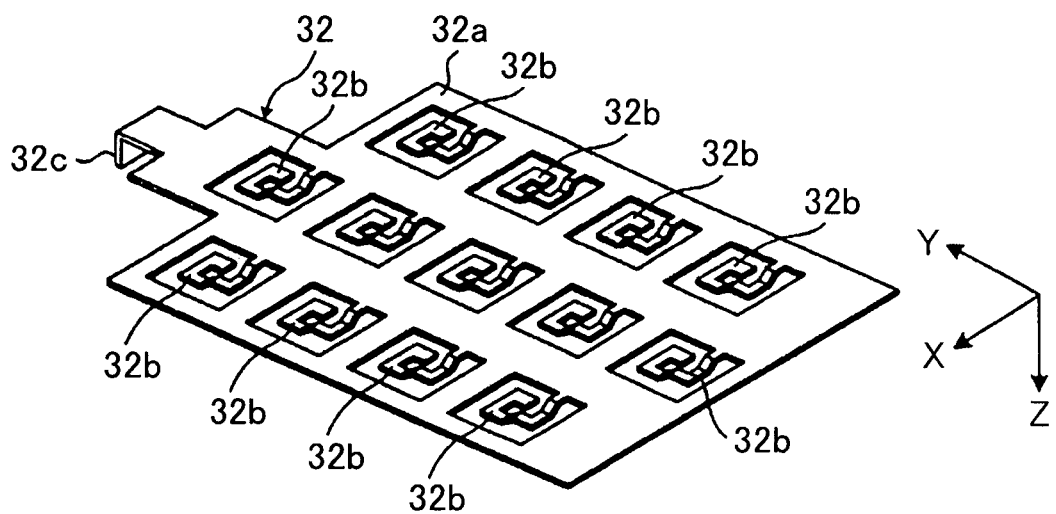
FIG. 4 is a view illustrating a bus bar to be connected to negative terminals of the single cells in Embodiment 1.

Next will be described the bus bar 32 (the second connection member) in detail. FIG. 4 is a view illustrating an overall configuration of the bus bar 32 to be connected to the negative terminals 13 of the single cells 10. Similarly to the bus bar 31, the bus bar 32 of the present embodiment is provided with a plurality of connecting portions 32b respectively corresponding to the plurality of single cells 10 formed integrally with a plate-shaped member 32a (corresponding to a substrate in the present invention), so that the plurality of connecting portions 32b is placed so as to be separated from the negative terminals 13 of the single cell 10 by a predetermined distance (see FIG. 1).

The connecting portion 32b formed in the bus bar 32 of the present embodiment is a connecting portion electrically connected to the negative terminal 13 of the single cell 10, and is used as a fuse that cuts off an electric connection with the single cell 10 (the negative terminal 13) by fusing at the time when a current of a predetermined value or more flows therein.

The plate-shaped member 32a is a flat plate material with its thickness (plate-thickness) direction being along the Z-direction. As illustrated in FIG. 4, the plurality of connecting portions 32b is formed by press punching at a predetermined interval at respective positions corresponding to arrangement positions of the single cells 10 (the negative terminals 13) with the Z-direction being taken as a punching direction.

Figure 5:
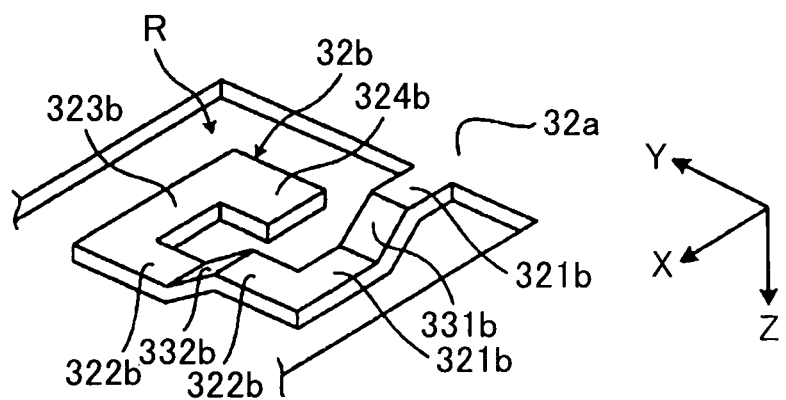
FIG. 5 is a schematic perspective view illustrating a configuration of a connecting portion of the bus bar in Embodiment 1.
Figure 6:
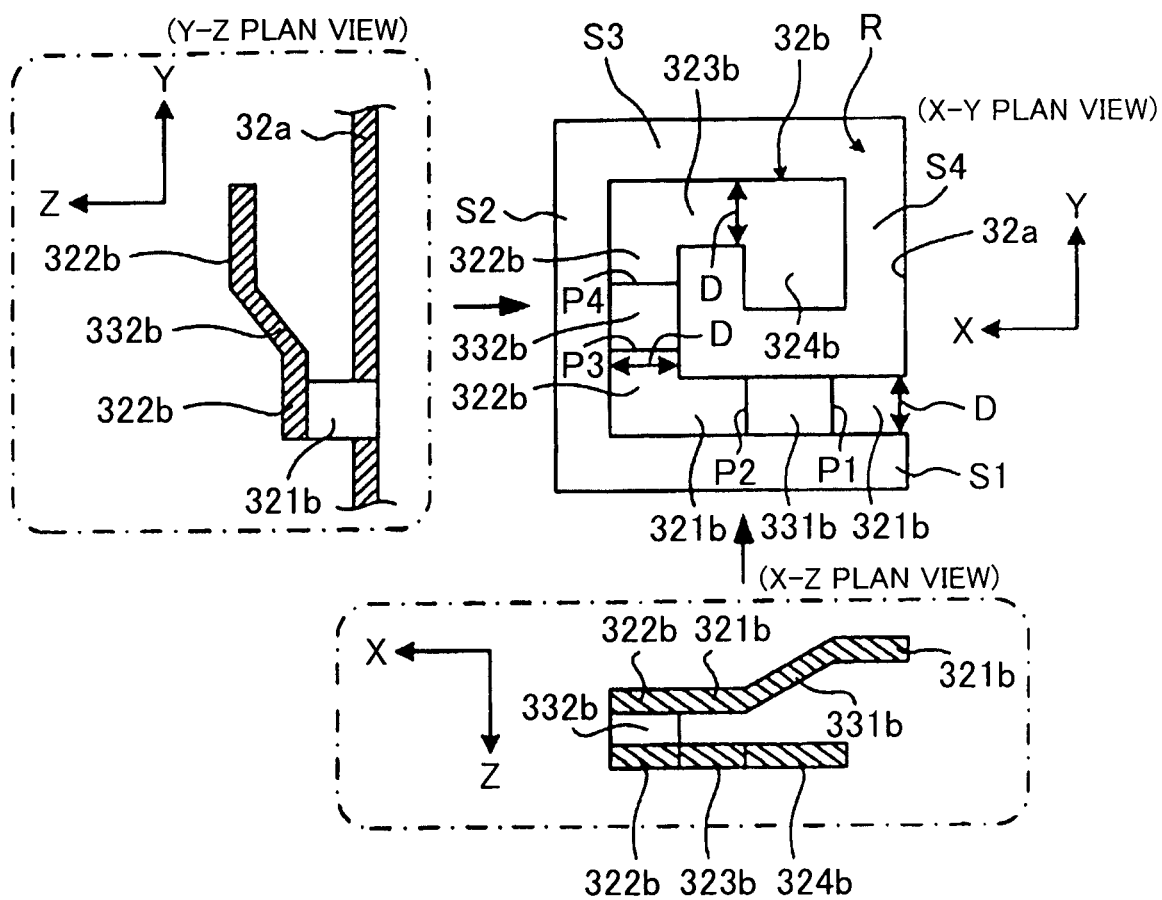
FIG. 6 is a view illustrating the configuration of the connecting portion of the bus bar in Embodiment 1 and illustrating an exemplary configuration of the connecting portion when viewed from each of three-dimensional directions.

FIG. 5 is a schematic perspective view illustrating a configuration of the connecting portion 32b of the bus bar 32. FIG. 6 is a view illustrating an exemplary configuration of the connecting portion 32b of the bus bar 32 when viewed from each of the XYZ (three-dimensional) directions.

As illustrated in FIGS. 5 and 6, the connecting portion 32b is configured to include a plurality of extension portions extending generally in parallel with directions perpendicular to the punching direction (the Z-direction). Among the directions perpendicular to the punching direction (the Z-direction), an extension portion 321b extends from the plate-shaped member 32a along the X-direction, and an extension portion 322b is bent from the extension portion 321b so as to extend in the Y-direction. Further, an extension portion 323b is bent from the extension portion 322b, so as to extend in the X-direction in a direction reverse to an extending direction of the extension portion 321b. Each of the extension portions 321b, 322b, 323b can be formed by punching regions S1 to S4 of the plate-shaped member 32a in the Z-direction.

The extension portion 321b is a plate-shaped extension portion having a width D in the Y-direction, and one end (a root) thereof is formed integrally with the plate-shaped member 32a. The extension portion 321b extending in the X-direction is separated from the plate-shaped member 32a via the region S1 in the Y-direction.

The extension portion 322b is a plate-shaped extension portion having a width D in the X-direction, and is bent from the other end of the extension portion 321b by about 90 degrees in the Y-direction. The extension portion 322b extending in the Y-direction is separated from the plate-shaped member 32a via the region S2 in the X-direction.

The extension portion 323b is a plate-shaped extension portion having a width D in the Y-direction, and is bent from the other end of the extension portion 322b by about 90 degrees in the X-direction so as to extend in the X-direction generally in parallel with the extension portion 321b. That is, the extension portion 323b is an extension portion extending in the X-direction (inwardly) toward the root of the extension portion 321b in a direction reverse to a direction where the extension portion 321b extends in the X-direction. The extension portion 323b is separated from the plate-shaped member 32a via the region S3 in the Y-direction and also separated from the plate-shaped member 32a via the region S4 in the X-direction.

A contacting portion 324b making contact with the negative terminal 13 of the single cell 10 so as to be connected to the negative terminal 13 by welding is formed in a tip end of the extension portion 323b. The present embodiment deals with one example in which the contacting portion 324b is formed in a projecting manner inwardly in the Y-direction from the extension portion 323b, but may be formed in any shape according to a positional relationship with the negative terminal 13 of the single cell 10 appropriately. Further, the tip end of the extension portion 323b can be directly connected to the negative terminal 13 of the single cell 10, as the contacting portion 324b. Note that the contacting portion 324b can be formed wider in the X-direction or the Y-direction than each of the extension portions.

As such, the connecting portion 32b of the present embodiment is formed such that a region with the same size as or a larger size than the negative terminal 13 (a bottom part of the battery outer case 11) of the single cell 10 is punched by press punching. The connecting portion 32b is configured such that the plurality of extension portions extended from the plate-shaped member 32a is placed in a spiral manner toward that center of a punched region R in which a central part of the negative terminal 13 is placed.

In the present embodiment, the plurality of extension portions is formed in a U-shape as a whole, and the region R where the connecting portion 32b of the plate-shaped member 32a is formed is subjected to punching so as to leave each of the extension portions with the extension portion 321b being as a base end, thereby providing the connecting portion 32b formed integrally with the plate-shaped member 32a in the region R thus punched.

Note that the extension portion 323b of the present embodiment is formed so as to extend from the extension portion 322b in the X-direction in a direction reverse to a direction where the extension portion 321b extends. Because of this, reduction (compactification) of a size of the connecting portion 32b can be achieved.

Further, the present embodiment exemplifies the connecting portion 32b formed in a U-shape, but the connecting portion 32b may have other shapes. For example, the connecting portion 32b may be formed in an L-shape constituted by the extension portions 321b, 322b including bent portions that will be described later.

As illustrated in FIG. 6, the connecting portion 32b is formed so as to project in the Z-direction (the punching direction) from the plate-shaped member 32a toward the negative terminal 13. In the extension portions 321b, 322b of the present embodiment, bent portions 331b, 332b bent in the punching direction are formed. The bent portion 331b can be formed such that the whole extension portion 321b extending in the X-direction is bent along the X-direction perpendicular to the punching direction. The bent portion 331b has the same width D as the extension portion 321b in the Y-direction, and forms a step relative to the extension portion 322b in the Z-direction.

More specifically, the bent portion 331b is formed such that a plate-thickness surface is bent in a direction away from the bus bar 32 from a width-direction bending line P1 in the extension portion 321b extending in the X-direction, and further bent from a bending line P2 so as to be generally in parallel with an XY-plane so that the plate-thickness surface approaches the bus bar 32. This bending can be performed at the same time with punching or in a step different from the punching.

The bent portion 332b can be formed such that the whole extension portion 322b extending in the Y-direction is bent along the Y-direction perpendicular to the punching direction. As illustrated in FIG. 6, the bent portion 332b has the same width D as the extension portion 322b in the X-direction, and forms a step relative to the extension portion 323b in the Z-direction. Similarly to the bent portion 331b, the bent portion 332b is also formed such that its plate-thickness surface is bent in a direction away from the bus bar 32 from a width-direction bending line P3 in the extension portion 322b extending in the Y-direction, and the plate-thickness surface is further bent from a bending line P4 so as to be generally in parallel with the XY-plane so that the plate-thickness surface approaches the bus bar 32.

Here, a relationship between the bent portions 331b, 332b is described. As illustrated in FIG. 6, the bent portions 331b, 332b are formed by bending the whole plate-thickness surface at origins, i.e., the bending lines (fold lines) P1 to P4 extending in the width direction, in respective regions of the plate-shaped extension portions 321b, 322b.

That is, the bent portion 331b is formed such that the whole extension portion 321b is bent in a thickness direction along the X-direction perpendicular to the punching direction (an X-Z plane view in FIG. 6), and the bent portion 332b is formed such that the whole extension portion 322b is bent in the thickness direction along the Y-direction perpendicular to the punching direction (a Y-Z plane view in FIG. 6). Accordingly, the bent portion 331b and the bent portion 332b are bent in the punching direction, and are oriented in respective directions (the X-direction, the Y-direction) perpendicular to each other among the directions perpendicular to the punching direction. Here, the bent portions 331b, 332b are bent in the same orientation in the Z-direction so as to project toward a side where the negative terminal 13 of the single cell 10 is placed.

In the battery block 1, when a current flows in the single cell 10 (the negative terminal 13) and the bus bar 32 (the connecting portion 32b), the connecting portion 32b is displaced relative to the negative terminal 13 of the single cell 10 due to thermal expansion/thermal contraction, and is also displaced due to vibration or the like. Because of this, stresses in the XYZ directions act on the connecting portion 32b along with such displacements.

Figure 7:
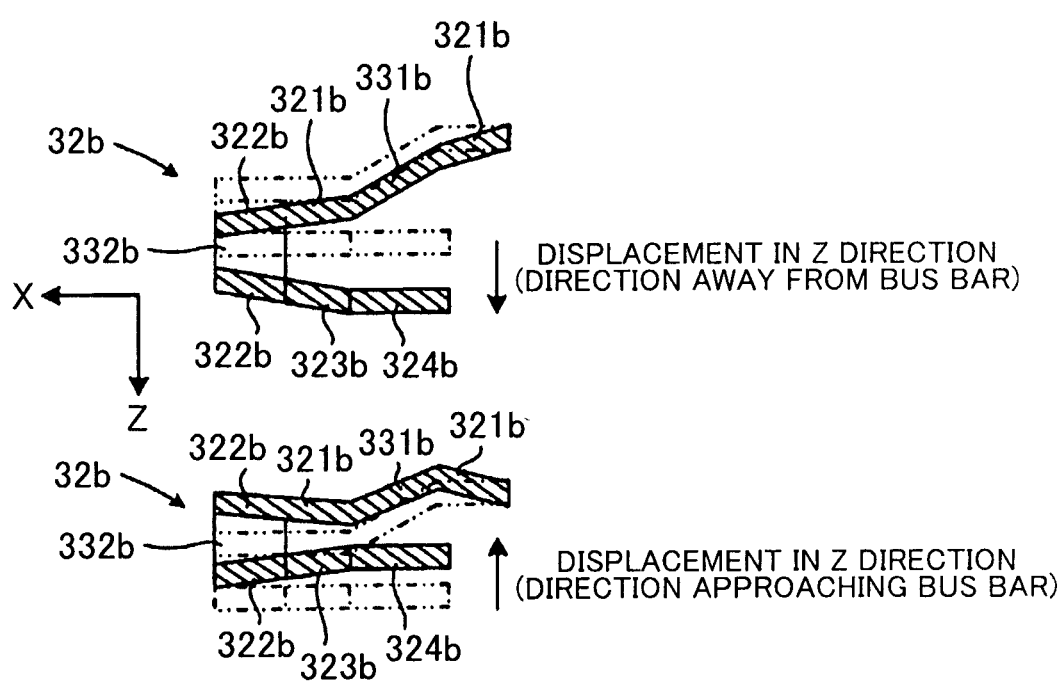
FIG. 7 is a view illustrating one example of absorption/dispersion of a stress at the connecting portion according to a displacement in a longitudinal direction of the single cell, in Embodiment 1.

FIG. 7 is a view illustrating one example of absorption/dispersion of a stress applied to the connecting portion 32b according to a displacement in the longitudinal direction of the single cell 10, i.e., a displacement in the Z-direction in terms of a positional relationship between the bus bar 32 and the single cell 10.

As illustrated in FIG. 7, the whole connecting portion 32b has the same thickness as the plate-shaped member 32a, and its plate-thickness surface faces the Z-direction. On this account, with respect to a displacement between the single cell 10 and the connecting portion 32b in the Z-direction, the whole connecting portion 32b functions as a leaf spring that warps in the thickness direction, so as to absorb/disperse a stress in the thickness direction. That is, a shearing force relative to a lengthwise direction of the plate material which shearing force is perpendicular to the plate-thickness surface is restrained, so that the whole connecting portion 32b in the thickness direction absorbs/disperses the stress acting in the Z-direction.

Accordingly, even if the connecting portion 32b connected to the negative terminal 13 of the single cell 10 is displaced in a direction away from the bus bar 32 (the plate-shaped member 32a) (see an upper view in FIG. 7), the stress does not act from a direction perpendicular to a press cutout section of the connecting portion 32b, so that a shearing force in the width direction of each of the extension portions 321b, 322b, 323b is restrained, and the each of the extension portions 321b, 322b, 323b warps so as to expand in the thickness direction, thereby absorbing/dispersing the stress.

Further, in a case where the connecting portion 32b connected to the negative terminal 13 of the single cell 10 is displaced in a direction approaching the bus bar 32 (the plate-shaped member 32a) (see a lower view in FIG. 7), each of the extension portions 321b, 322b, 323b warps in the thickness direction so as to approach the bus bar 32 (to be narrowed), thereby absorbing/dispersing a stress. Even at this time, in a state where the stress does not act from the direction perpendicular to the press cutout section of the connecting portion 32b, each of the extension portions 321b, 322b, 323b functions as a leaf spring on the plate-thickness surface.

Figure 8:
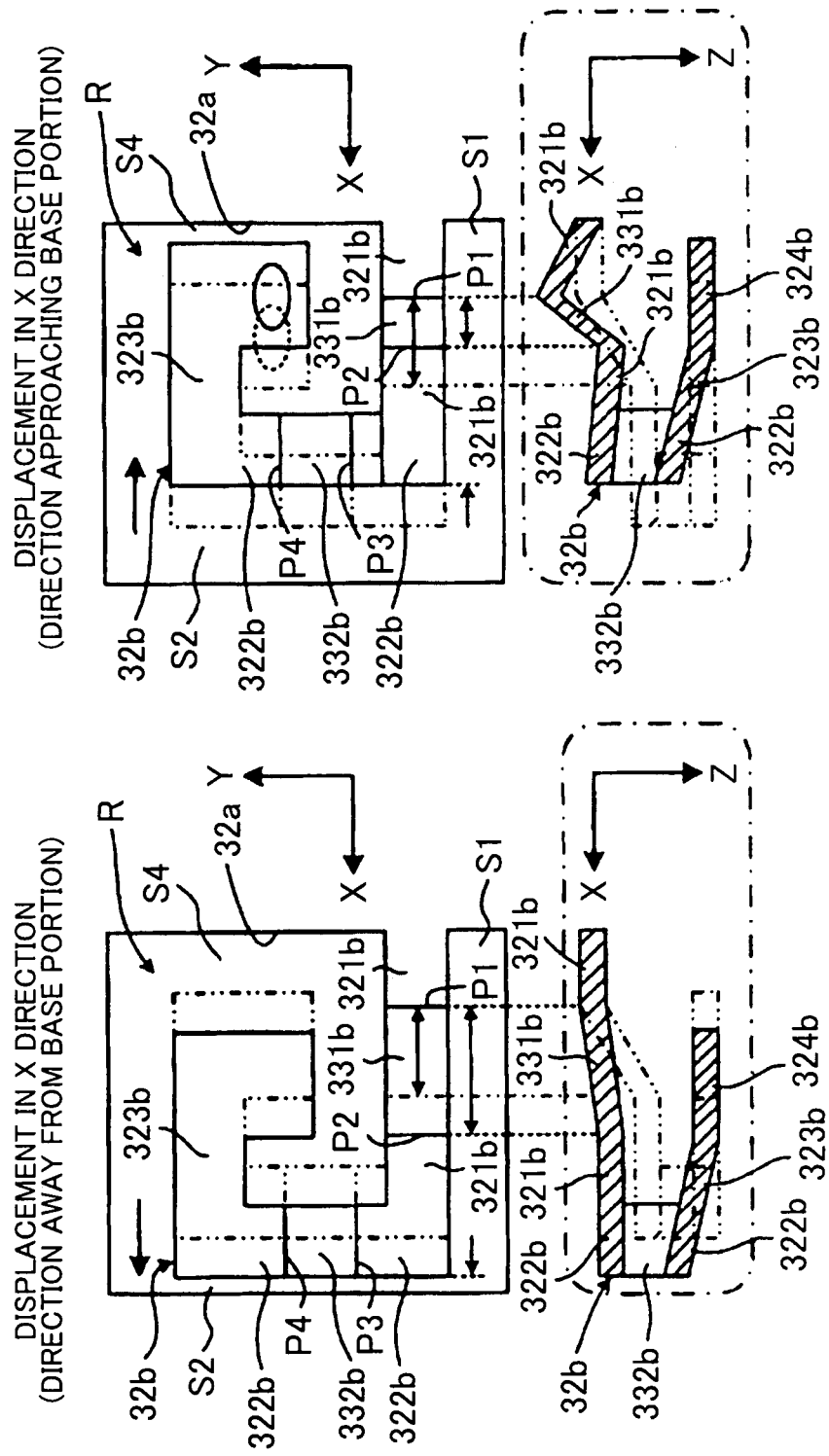
FIG. 8 is a view illustrating one example of absorption/dispersion of a stress at the connecting portion according to a displacement in a first direction perpendicular to the longitudinal direction of the single cell, in Embodiment 1.

FIG. 8 is a view illustrating one example of absorption/dispersion of a stress at the connecting portion 32b according to a displacement in the X-direction (a first direction) perpendicular to the longitudinal direction of the single cell 10.

As illustrated in FIG. 8, for example, in a case where the single cell 10 is displaced in a direction away from the plate-shaped member 32a, along the extension portion 321b extending in the X-direction (a displacement in the X-direction in which the region S4 is widened and the region S2 is narrowed in the X-direction), the bent portion 331b is displaced so that an inclined surface that is inclined in the Z-direction becomes generally parallel to the XY-plane, and the whole extension portion 321b approaches the bus bar 32 in the Z-direction. In the displacement of the single cell 10 in the X-direction at this time, the bent portion 331b extends in the X-direction so that an angle of that inclined surface of the bent portion 331b which is inclined in the Z-direction becomes gentle. Hereby, a stress applied to the extension portion 321b is absorbed/dispersed and the whole extension portion 321b warps in the thickness direction (the Z-direction) so as to approach the bus bar 32, thereby absorbing/dispersing the stress.

In the meantime, for example, in a case where the single cell 10 is displaced in a direction approaching the plate-shaped member 32a, along the extension portion 321b extending in the X-direction (a displacement in the X-direction in which the region S2 is widened and the region S4 is narrowed in the X-direction), the bent portion 331b is displaced so that the inclined surface that is inclined in the Z-direction becomes generally perpendicular to the XY-plane and the whole extension portion 321b approaches the bus bar 32 in the Z-direction. At this time, in terms of a stress caused due to the displacement of the single cell 10 in the X-direction, the bent portion 331b contracts in the X-direction so that the angle of that inclined surface of the bent portion 331b which is inclined in the Z-direction becomes steep. Hereby, a stress applied to the extension portion 321b is absorbed/dispersed and the whole extension portion 321b warps in the thickness direction (the Z-direction) so as to approach the bus bar 32, thereby absorbing/dispersing the stress.

Thus, the inclination of the bent portion 331b in the Z-direction changes relative to the displacement of the connecting portion 32b in the X-direction, so that the bent portion 331b is displaced so as to extend or contract in the X-direction. The displacement of the bent portion 331b in the X-direction is converted into warping of the plate-thickness surface of the extension portion 321b in the Z-direction, so that the whole extension portion 321b warps in the thickness direction, and hereby, the stress is absorbed/dispersed relative to the displacement of the connecting portion 32b in the X-direction. Note that, at the time when the extension portion 321b is displaced in the Z-direction so as to approach the bus bar 32 relative to the displacement in the X-direction, the whole extension portion 322b can warp in the Z-direction in terms of its thickness direction, and hereby, the stress can be absorbed/dispersed relative to the displacement of the connecting portion 32b in the X-direction.

Figure 9:
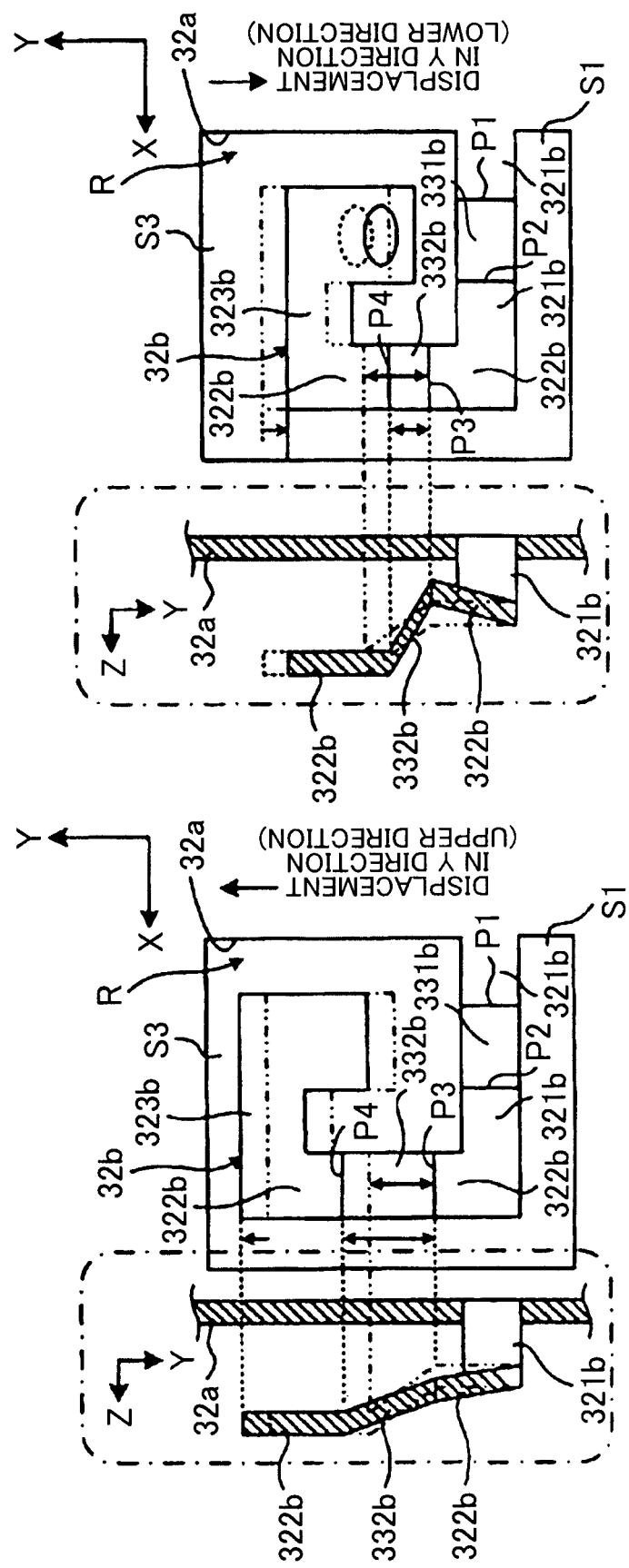
FIG. 9 is a view illustrating one example of absorption/dispersion of a stress at the connecting portion according to displacement in a second direction perpendicular to the longitudinal direction of the single cell, in Embodiment 1.

FIG. 9 is a view illustrating one example of absorption/dispersion of a stress at the connecting portion 32b according to a displacement in the Y-direction (a second direction) perpendicular to the longitudinal direction of the single cell 10.

As illustrated in FIG. 9, for example, in a case where the single cell 10 is displaced along the extension portion 322b extending in the Y-direction so that the region S3 is narrowed in the Y-direction, the bent portion 332b is displaced so that its inclined surface that is inclined in the Z-direction becomes generally parallel to the XY-plane and the whole extension portion 322b is distanced from the bus bar 32 in the Z-direction. At this time, in terms of a stress caused due to the displacement of the single cell 10 in the Y-direction, the bent portion 332b extends in the Y-direction so that an angle of that inclined surface of the bent portion 332b which is inclined in the Z-direction becomes gentle. Hereby, a stress applied to the extension portion 322b is absorbed/dispersed and the whole extension portion 322b warps in the thickness direction (the Z-direction) so as to be distanced from the bus bar 32, thereby absorbing/dispersing the stress.

In the meantime, for example, in a case where the single cell 10 is displaced along the extension portion 322b extending in the Y-direction so that the region S3 is widened in the Y-direction, the bent portion 332b is displaced so that its inclined surface that is inclined in the Z-direction becomes generally perpendicular to the XY-plane and the whole extension portion 322b approaches the bus bar 32 in the Z-direction. At this time, in terms of a stress caused due to the displacement of the single cell 10 in the Y-direction, the bent portion 332b contracts in the Y-direction so that the angle of that inclined surface of the bent portion 332b which is inclined in the Z-direction becomes steep. Hereby, a stress applied to the extension portion 322b is absorbed/dispersed and the whole extension portion 322b warps in the thickness direction (the Z-direction) so as to approach the bus bar 32, thereby absorbing/dispersing the stress.

Thus, the inclination of the bent portion 332b in the Z-direction changes relative to the displacement of the connecting portion 32b in the Y-direction, so that the bent portion 332b is displaced so as to extend or contract in the Y-direction. The displacement of the bent portion 332b in the Y-direction is converted into warping of the plate-thickness surface of the extension portion 322b in the Z-direction, so that the whole extension portion 322b warps in the thickness direction, and hereby, the stress is absorbed/dispersed relative to the displacement of the connecting portion 32b in the Y-direction. Note that, even in the displacement in the Y-direction, the whole extension portion 321b can warp in the Z-direction in terms of its thickness direction, and hereby, the stress can be absorbed/dispersed relative to the displacement of the connecting portion 32b in the Y-direction.

In the present embodiment, the bent portion 331b is formed such that the extension portion 321b is bent in the thickness direction along the X-direction perpendicular to the punching direction, and the bent portion 332b is formed such that the extension portion 322b is bent in the thickness direction along the Y-direction perpendicular to the punching direction. The bent portion 331b and the bent portion 332b are inclined so as to face the X-direction and the Y-direction, respectively, which are perpendicular to each other among the directions perpendicular to the punching direction.

On this account, the extension portions 321b, 322b warp like a leaf spring in the thickness direction relative to the displacements in the X-direction and the Y-direction, which are perpendicular to the punching direction, so that stresses applied to the connecting portion 32b in the X-direction and in the Y-direction are absorbed/dispersed by the plate-thickness surface of the connecting portion 32b. Further, even in terms of the displacement in the punching direction, the stress can be absorbed/dispersed by the plate-thickness surface of the connecting portions 32b. Accordingly, it is possible to restrain a shearing force from acting on the press cutout section of the connecting portion 32b, thereby making it possible to efficiently absorb/disperse stresses relative to those displacements in three-dimensional directions between the single cell 10 and the bus bar 32 which are caused due to vibration or the like.

Here, the connecting portion 32b of the present embodiment has a predetermined fusing characteristic as a fuse, as described above. In view of this, the widths D, in respective directions, of respective extension portions 321b, 322b, 323b constituting the connecting portion 32b can be set to a magnitude that is fused at the time when a current of a predetermined value or more, which is set in advance, flows therein, as the fusing characteristic.

For example, when the width D is wide, it is difficult to perform fusing (an upper-limit current value relative to the fusing characteristic is high), but when the width D is narrowed, it is easy to perform fusing (the upper-limit current value relative to the fusing characteristic is low). As such, when the widths D of the extension portions 321b, 322b, 323b are set to be wide or narrow according to fusing characteristic, it is possible to realize the bus bar 32 which allows the connecting portion 32b to function as a fuse, which can absorb/disperse stresses in respective directions perpendicular to the punching direction by the bent portions 331b, 332b, and which can efficiently absorb/disperse the stresses relative to those displacements in the three-dimensional directions between the single cell 10 and the bus bar 32 which are caused due to vibration or the like.

Figure 10:
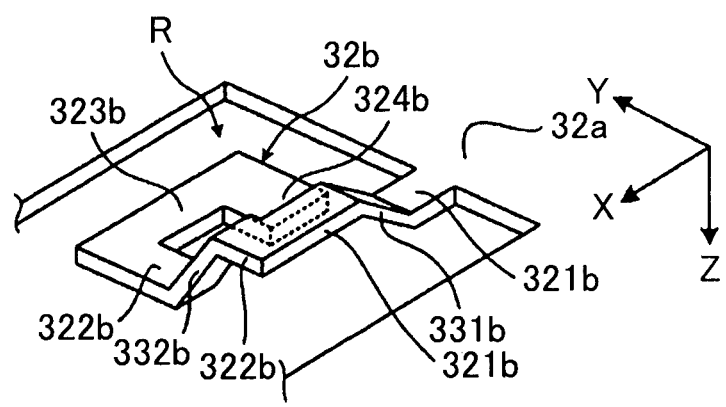
FIG. 10 is a schematic perspective view illustrating a modification of the connecting portion of the bus bar in Embodiment 1.
Figure 11:
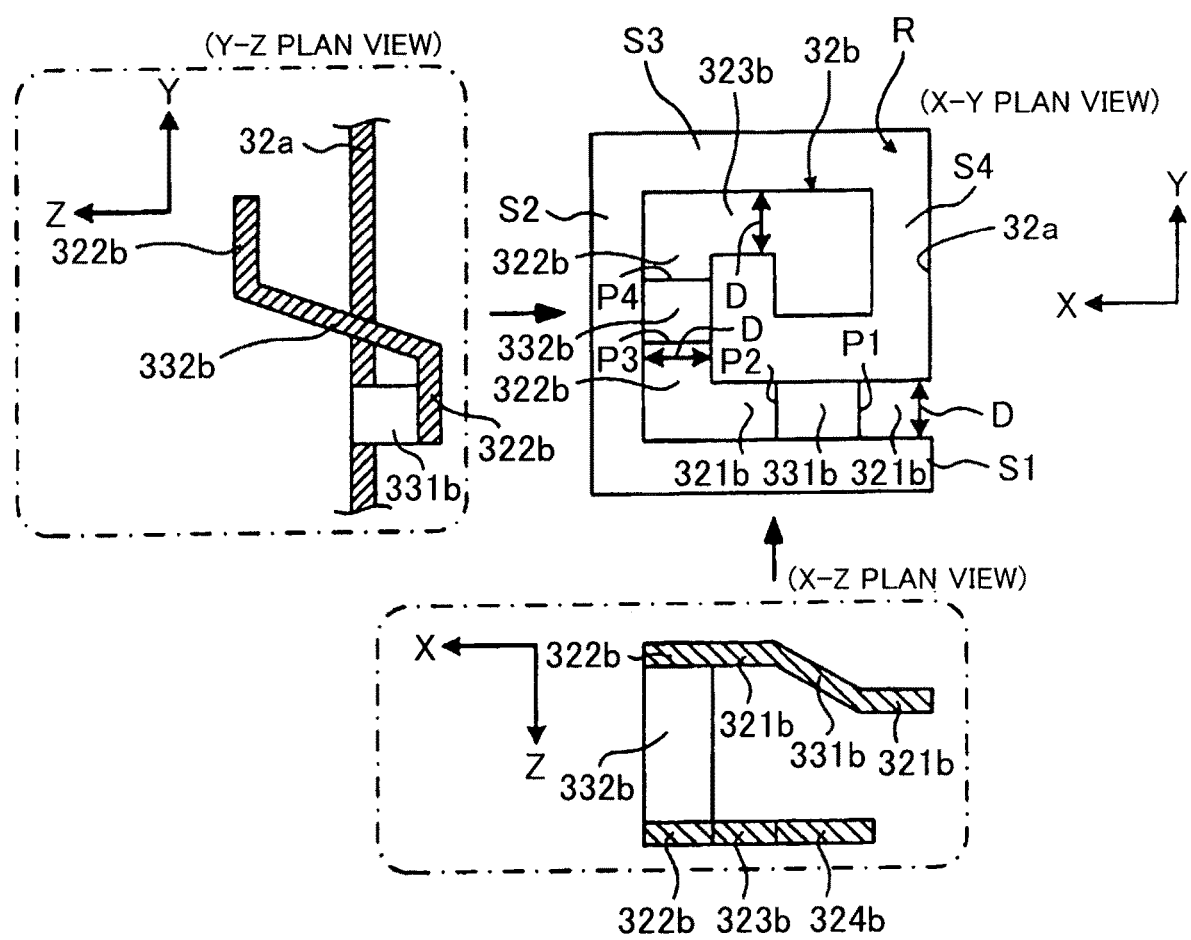
FIG. 11 is a view illustrating a configuration of the connecting portion in the modification illustrated in FIG. 10 and illustrating an exemplary configuration of the connecting portion when viewed from each of three-dimensional directions.

FIG. 10 is a schematic perspective view illustrating a modification of the connecting portion 32b of the present embodiment. FIG. 11 is a view illustrating a configuration of the connecting portion 32b in the modification illustrated in FIG. 10 and illustrating an exemplary configuration of the connecting portion when viewed from each of three-dimensional directions.

As illustrated in FIGS. 10, 11, the connecting portion 32b of the modification is configured such that respective bending directions of two bent portions, i.e., bent portions 331b, 332b are different from each other in the punching direction.

More specifically, the bent portion 331b is formed such that a plate-thickness surface thereof is bent in a direction approaching a case-main-body-101 side placed on an opposite side to a negative-terminal-13 side of a single cell 10 and on an outer side relative to a bus bar 32 in the Z-direction, from a width-direction bending line P1 in an extension portion 321b extending in the X-direction, and further, the plate-thickness surface is bent from a bending line P2 so as to be generally in parallel with an XY-plane so that the plate-thickness surface approaches the bus bar 32. In the meantime, the bent portion 332b is bent in a direction approaching the negative-terminal-13 side of the single cell 10 in the Z-direction from the extension portion 321b placed on the case-main-body-101 side relative to a plate-shaped member 32a, so as to be formed in the same bending direction as in the example of FIG. 5.

Even in the present modification, as described above, the extension portions 321b, 322b warp like a leaf spring on the plate-thickness surface, relative to displacements in the X-direction and the Y-direction, which are perpendicular to the punching direction, and further, the plate-thickness surface of the connecting portion 32b also warps like a leaf spring relative to a displacement in the punching direction, so that the whole connecting portion 32b can absorb/disperse stresses by the plate-thickness surface.

The modification illustrated in FIG. 10, etc., can be applied according to a space between the case main body 101 and the bus bar 32 in the Z-direction (see FIG. 1), for example, and a distance between the bus bar 32 and the negative terminal 13 of the single cell 10 can be narrowed in comparison with the example of FIG. 5.

Note that, in the present embodiment, the extension portions 321b, 322b are formed along the X-direction and the Y-direction, respectively, but the extension portions 321b, 322b may be provided so that the bent portions 331b, 332b face directions perpendicular to each other in respective directions inclined from the X-direction and the Y-direction. That is, the bent portions 331b, 332b may not be provided along the X-direction and the Y-direction, respectively, provided that the bent portions 331b, 332b are provided so as to be perpendicular to each other in respective directions perpendicular to the punching direction.

Further, the connecting portion 32b can be formed such that a bent portion bent in the same or different bending direction is formed in the extension portion 323b, so that respective bent portions are formed in the extension portions 321b, 322b, 323b. In this case, at least two of three bent portions can be provided so as to face directions perpendicular to each other among the directions perpendicular to the punching direction. Further, the at least two bent portions can be configured so as to be provided in the extension portion 321b and the extension portion 323b, or in the extension portion 322b and the extension portion 323b.

Further, in the present embodiment, the extension portions 321b, 322b, 323b are formed integrally with each other in a generally U-shape, and bending parts thereof are generally at 90 degrees, but the present embodiment is not limited to this. For example, the connecting portion 32b can be formed such that the extension portions 321b, 322b, 323b are bent at a given angle so that the bent portions 331b, 332b are perpendicular to each other in respective directions perpendicular to the punching direction. Further, for example, the bending part can have a shape bent in a round curved shape.

Note that the present embodiment deals with one example in which the connecting portion 32b having a fuse function is provided in the bus bar 32, which is a negative bus bar, but the present embodiment is also applicable to a connecting portion of the bus bar 31, which is a positive bus bar. That is, in the battery block 1, the connecting portion 32b of the present embodiment can be applied to both of or either one of the positive bus bar and the negative bus bar.

Embodiment 2

Figure 12:
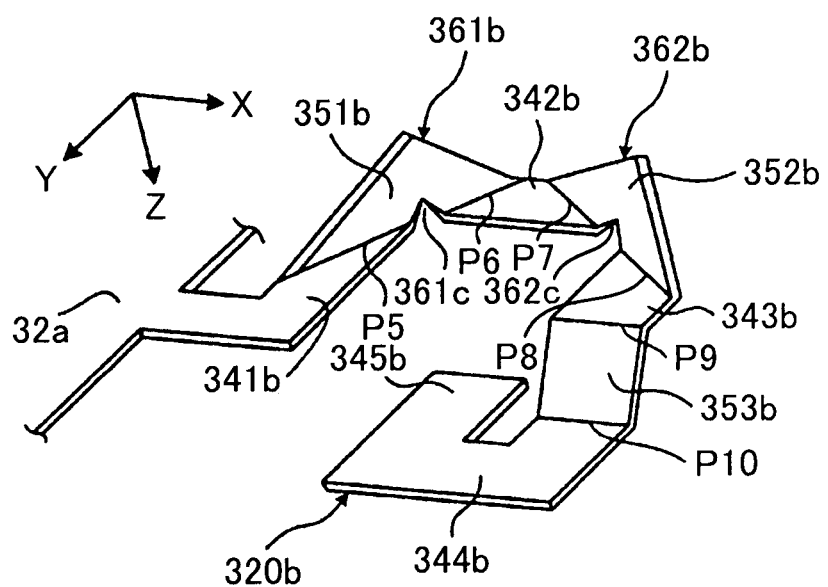
FIG. 12 is a schematic perspective view illustrating a configuration of a connecting portion of a bus bar in Embodiment 2.
Figure 13:
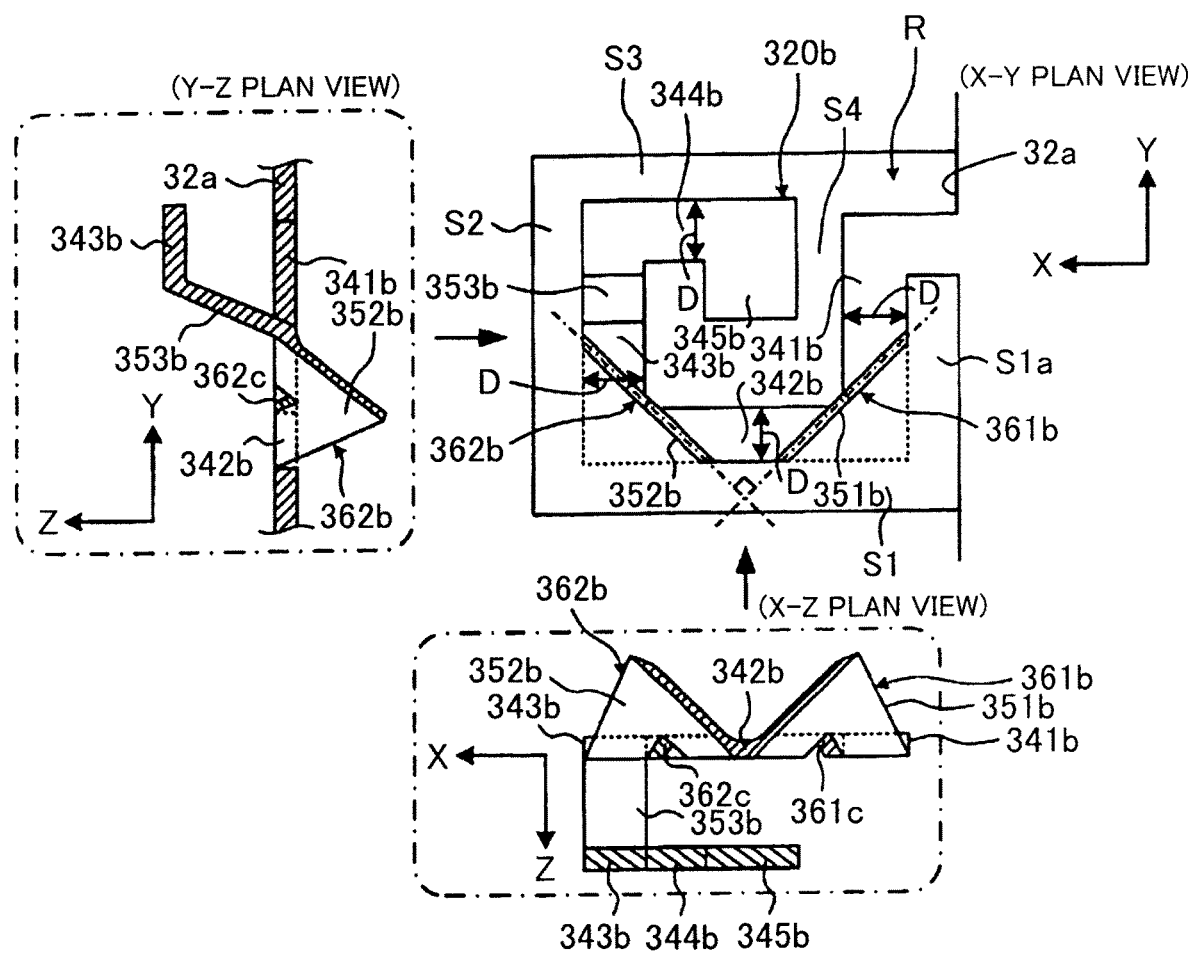
FIG. 13 is a view illustrating the configuration of the connecting portion of the bus bar in Embodiment 2 and illustrating an exemplary configuration of the connecting portion when viewed from each of three-dimensional directions.
Figure 14:
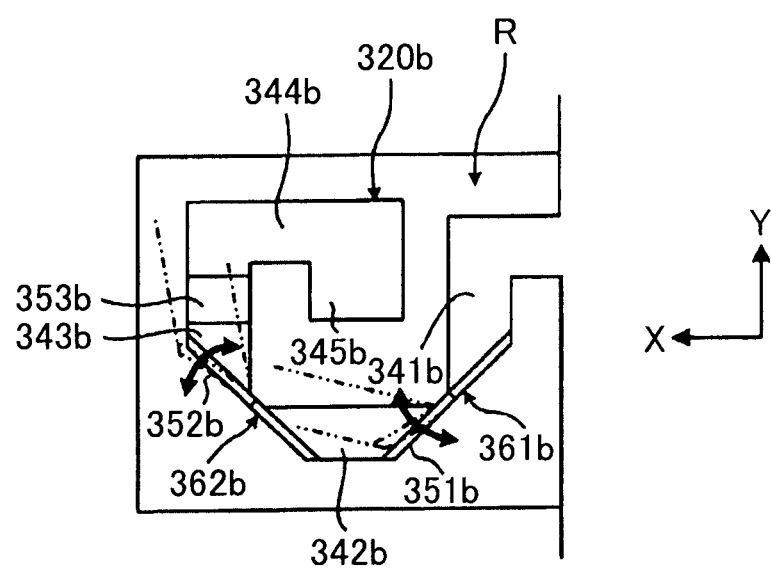
FIG. 14 is a view illustrating one example of absorption/dispersion of a stress at the connecting portion according to a displacement in a direction perpendicular to a longitudinal direction of the single cell in Embodiment 2.

FIGS. 12 to 14 are views each illustrating Embodiment 2 of the present invention. In the present embodiment, a member having the same function as the member described in Embodiment 1 has the same reference numeral, and a detailed description thereof is omitted. The present embodiment mainly describes points different from Embodiment 1.

FIG. 12 is a schematic perspective view illustrating a configuration of a connecting portion 320b of a bus bar 32 of the present embodiment. FIG. 13 is a view illustrating the configuration of the connecting portion 320b of the bus bar 32 and illustrating an exemplary configuration of the connecting portion when viewed from each of three-dimensional directions.

The connecting portion 320b of the bus bar 32 of the present embodiment includes: an extension portion 341b extending in the Y-direction; an extension portion 342b bent from the extension portion 341b in the X-direction so as to extend in the X-direction; an extension portion 343b bent from the extension portion 342b in the Y-direction so as to extend in the Y-direction in a direction reverse to an extending direction of the extension portion 341b; and an extension portion 344b bent from the extension portion 343b in the X-direction so as to extend in the X-direction in a direction reverse to an extending direction of the extension portion 342b. The extension portions 341b, 342b, 343b, 344b are formed integrally with each other from a plate-shaped member 32a with the extension portion 341b being taken as a base end.

The extension portion 341b is extended from the plate-shaped member 32a so as to extend in the Y-direction so that a plate-thickness surface thereof is generally parallel to a direction perpendicular to the punching direction via the plate-shaped member 32a and a region S1a. The extension portions 342b, 343b are also provided so as to be generally parallel to the direction perpendicular to the punching direction via regions S1, S2. Further, similarly to Embodiment 1, a contacting portion 345b making contact with a negative terminal 13 of a single cell 10 so as to be connected to the negative terminal 13 by welding is formed in a tip end of the extension portion 344b.

A bent portion 351b of the present embodiment is formed such that a bending part 361b between the extension portion 341b and the extension portion 342b is bent generally in parallel with the punching direction from a surface perpendicular to the punching direction. At this time, the bent portion 351b is formed such that a plate-thickness surface of the bending part 361b is bent so as to be generally parallel with the punching direction, along bending lines P5, P6 extending in a first direction inclined from the X-direction toward the Y-direction in the bending part 361b.

The bending line P5 and the bending line P6 are bending lines provided on the extension portion 341b and the extension portion 342b, respectively: the bending line P5 extends so as to be inclined in the X-direction relative to a width direction of the extension portion 341b extending in the Y-direction; and the bending line P6 extends so as to be inclined in the Y-direction relative to a width direction of the extension portion 342b extending in the X-direction. In the bending part 361b, these bending lines P5, P6 are continued linearly so as to form a bending line extending in the first direction.

In the bent portion 351b, the bending part 361b is bent such that its plate-thickness surface becomes generally parallel with the punching direction so that the bent portion 351b includes at least part of a corner 361c of the bending part 361b. With such a configuration, in the bent portion 35 lb bent such that the plate-thickness surface thereof is generally in parallel with the punching direction, the plate-thickness surface is placed so as not to become generally parallel with a direction perpendicular to the punching direction.

A bent portion 352b of the present embodiment is formed such that a bending part 362b between the extension portion 342b and the extension portion 343b is bent generally in parallel with the punching direction from the surface perpendicular to the punching direction. At this time, the bent portion 352b is formed such that a plate-thickness surface of the bending part 362b is bent so as to be generally parallel with the punching direction, along bending lines P7, P8 extending in a second direction inclined from the Y-direction toward the X-direction in the bending part 362b. The second direction is a direction perpendicular to the first direction of the bending part 361b among the directions perpendicular to the punching direction.

The bending line P7 and the bending line P8 are bending lines provided on the extension portion 342b and the extension portion 343b, respectively: the bending line P7 extends so as to be inclined in the Y-direction relative to a width direction of the extension portion 342b extending in the X-direction; and the bending line P8 extends so as to be inclined in the X-direction relative to a width direction of the extension portion 343b extending in the Y-direction. In the bending part 362b, these bending lines P7, P8 are continued linearly so as to form a bending line extending in the second direction.

Also, in the bent portion 352b, a plate-thickness surface of the bending part 362b is bent generally in parallel with the punching direction, so that the bent portion 352b includes at least part of a corner 362c of the bending part 362b. In the bent portion 352b bent such that the plate-thickness surface thereof is generally parallel with the punching direction, the plate-thickness surface is placed so as not to becomes generally parallel with the direction perpendicular to the punching direction.

In the bent portions 351b, 352b of the present embodiment, their respective plate-thickness surfaces are generally parallel with the punching direction (the Z-direction), and in an XY plan view perpendicular to the Z-direction, the respective plate-thickness surfaces face the first direction and the second direction so as to be perpendicular to each other.

Note that the extension portion 343b is provided with a bent portion 353b formed such that a whole plate-thickness surface thereof is bent in the Z-direction at origins, i.e., bending lines P9, P10 extending in a width direction, similarly to the bent portion shown in Embodiment 1. The extension portions 343b, 344b are formed so as to project toward a negative-terminal-13 side of the single cell 10 due to the bent portion 353b.

FIG. 14 is a view illustrating one example of absorption/dispersion of a stress at the connecting portion 320b according to displacements in the X-direction and the Y-direction perpendicular to a longitudinal direction of the single cell 10 of the present embodiment.

As illustrated in FIG. 14, since the bent portion 351b is formed such that the plate-thickness surface is bent generally in parallel with the punching direction, the plate-thickness surface can warp on the XY-plane, and hereby, stresses can be absorbed/dispersed relative to displacements of the connecting portion 320b in the XY-directions. Similarly, in the bent portion 352b, the plate-thickness surface can warp on the XY-plane, and hereby, stresses can be absorbed/dispersed relative to displacements of the connecting portion 320b in the XY-directions.

That is, in the bent portions 351b, 352b of the present embodiment, those plate-thickness surfaces of the bending parts 361b, 362b which are bent generally in parallel with the punching direction warp in respective directions perpendicular to the punching direction, thereby making it possible to absorb/disperse stresses relative to the displacements in the X-direction and in the Y-direction due to vibration or the like.

Particularly, in the present embodiment, as illustrated in FIG. 14, the bending parts 361b, 362b are placed at different positions in the X-direction so as to be distanced from each other, so that there are two axes around which the plate-thickness surfaces for absorbing/dispersing the stresses relative to a displacement of the contacting portion 345b connected to the negative terminal 13 warp. Accordingly, rotational orbits of the XY-plane are allowed at two axes around the bending parts 361b, 362b. For example, in a case where a stress is absorbed/dispersed only by the bent portion 351b, only one rotational orbit is allowed around the bending part 361b. However, if another rotational orbit is allowed around the bending part 362b by the bent portion 352b, the stress can be absorbed/dispersed efficiently by the plate-thickness surfaces warping relative to a whole displacement of the XY-plane.

Further, even in a case of a displacement in the punching direction, stresses can be absorbed/dispersed by those plate-thickness surfaces of the extension portions 341b, 342b, 343b, 344b which face the Z-direction, thereby making it possible to efficiently absorb/disperse the stresses relative to those displacements in the three-dimensional directions between the single cell 10 and the bus bar 32 which are caused due to vibration or the like, similarly to Embodiment 1.

Note that, in the present embodiment, the extension portion 343b is formed so as to extend in the Y-direction in a direction reverse to the extending direction of the extension portion 341b, and the extension portion 344b is formed so as to extend in the X-direction in a direction reverse to the extending direction of the extension portion 342b, thereby making it possible to achieve reduction (compactification) of a size of the connecting portion 320b.

Further, as illustrated in the above modification of Embodiment 1, in the connecting portion 320b of the present embodiment, respective bending directions of two bent portions, i.e., the bent portions 351b, 352b may be different from each other in a direction generally parallel to the punching direction.

DESCRIPTION OF THE REFERENCE NUMERALS

1 BATTERY BLOCK (POWER STORAGE DEVICE)
10 SINGLE CELL (STORAGE ELEMENT)
11 BATTERY OUTER CASE
12 POSITIVE TERMINAL
13 NEGATIVE TERMINAL
20 HOLDER
31, 32 BUS BAR (CONNECTION MEMBER)
31b, 32b CONNECTING PORTION
321b, 322b, 323b, 341b, 342b, 343b, 344b EXTENSION PORTION
331b, 332b, 351b, 352b, 353b BENT PORTION

The invention claimed is:
1. A connection member configured to electrically connect respective storage elements to each other in a power storage device constituted by a plurality of storage elements, the connection member comprising:
an electrically conductive substrate; and
a plurality of connecting portions configured to connect to electrodes of the respective storage elements, and cut off electric connection with the storage elements by fusing at a time when a current of a predetermined value or more flows therein,
wherein each connecting portion of the plurality of connecting portions is formed by performing punching along a punching axis on the electrically conductive substrate,
wherein each connecting portion comprises:
a first extension portion extending in a first direction perpendicular to the punching axis;
a second extension portion extending from the first extension portion and extending, in a second direction perpendicular to the punching axis; and
a third extension portion extending from the second extension portion in a direction parallel to the first direction,
a first bent portion that is part of the first extension portion and is bent so as to ascend or descend with respect to other portions of the first extension portion along the punching axis, and extend in the first direction, and
a second bent portion that is part of the second extension portion and is bent so as to ascend or descend with respect to other portions of the second extension portion along the punching axis, and extend in the second direction wherein the first extension portion is offset with respect to at least one of the second extension portion or the third extension portion, along the punching axis, wherein the first and second bent portions are formed by bending the first extension portion and the second extension portion in the punching axis along their respective extending directions, and wherein the first bent portion and the second bent portion each have a planar shape that is straight.

2. The connection member according to claim 1, wherein the first extension portion is offset with respect to the second extension portion and the third extension portion, along the punching axis.

3. The connection member according to claim 1, wherein respective bending directions of the first and second bent portions are the same in the punching axis.

4. The connection member according to claim 1, wherein respective bending directions of the first and second bent portions are different from each other in the punching axis.

5. The connection member according to claim 1, wherein:
each of the plurality of storage elements is a cylindrical storage element having a longitudinal direction;
the plurality of storage elements are arranged in-line so that positive electrodes or negative electrodes of each of the plurality of storage elements all face the same direction; and
the connection member is connected to respective negative electrodes of each of the plurality of storage elements.

6. A power storage device comprising:
the connection member according to claim 1; and
wherein the plurality of storage elements are electrically connected in parallel with each other by the connection member.

7. The connection member according to claim 1, wherein the first extension portion and the second extension portion are arranged at a right angle with respect to each other, and the second extension portion and the third extension portion are arranged at a right angle with respect to each other.

8. The connection member according to claim 1, wherein the first, second, and third extension portions do not overlap each other along the punching axis.

9. A connection member configured to electrically connect respective storage elements to each other in a power storage device constituted by a plurality of storage elements, the connection member comprising:
an electrically conductive substrate; and
a plurality of connecting portions configured to connect to electrodes of the respective storage elements, and cut off electric connection with the storage elements by fusing at a time when a current of a predetermined value or more flows therein, wherein
each connecting portion of the plurality of connecting portions is formed by performing punching along a punching axis on the electrically conductive substrate, and
wherein each connecting portion comprises:
a first extension portion;
a second extension portion extending from the first extension portion;
a third extension portion extending from the second extension portion: and
a fourth extension portion,
a triangular-shaped first bent portion that bridges the first and second extension portions and is bent towards the punching axis, and
a triangular-shaped second bent portion that bridges the second and third extension portions and is bent towards the punching axis,
a rectangular-shaped third bent portion that connects the third and fourth extension portions,
wherein the fourth extension portion is offset along the punching axis with respect to at least one of the first extension portion, the second extension portion, and the third extension portion, and
wherein the triangular-shaped first bent portion and the triangular-shaped second bent portion each have a planar shape that extends straight.

10. The connection member according to claim 9, wherein the first extension portion and the second extension portion are arranged at a right angle with respect to each other, and the second extension portion and the third extension portion are arranged at a right angle with respect to each other.

11. The connection member according to claim 9, wherein the first, second, third, and fourth extension portions do not overlap each other along the punching axis.

* * * * *